United States Patent [19]

Gruber et al.

[11] Patent Number: 4,530,682
[45] Date of Patent: Jul. 23, 1985

[54] TENSIONING ARRANGEMENT WITH A DAMPING DEVICE FOR A BELT DRIVE

[75] Inventors: Gerhard Gruber, Auenwald; Peter Moser, Weinstadt; Ulrich Conrad, Ludwigsburg; Jiri Vlach, Donzdorf, all of Fed. Rep. of Germany

[73] Assignee: Daimler-Benz Aktiengesellschaft, Stuttgart, Fed. Rep. of Germany

[21] Appl. No.: 470,781

[22] Filed: Mar. 1, 1983

[30] Foreign Application Priority Data

Mar. 6, 1982 [DE] Fed. Rep. of Germany ....... 3208184

[51] Int. Cl.³ ............................................. F16H 7/12
[52] U.S. Cl. ................................................... 474/133
[58] Field of Search ............... 474/115, 117, 133, 135, 474/138

[56] References Cited

U.S. PATENT DOCUMENTS

| 1,704,532 | 3/1929 | Curtis | 474/135 |
|---|---|---|---|
| 2,134,159 | 10/1938 | Von Hofe | 474/133 X |
| 2,957,561 | 10/1960 | Musgrave | |
| 3,464,282 | 9/1969 | Grobowski | 474/135 X |
| 3,483,688 | 12/1969 | Hollyday | |
| 3,545,294 | 12/1970 | Dankowski | 474/133 X |
| 3,800,612 | 4/1974 | Fulghum | 474/135 |
| 4,381,165 | 4/1983 | James et al. | 474/135 X |

FOREIGN PATENT DOCUMENTS 958070 1/1957 Fed. Rep. of Germany .
1919213 11/1970 Fed. Rep. of Germany .

Primary Examiner—James A. Leppink
Assistant Examiner—Frank H. McKenzie, Jr.
Attorney, Agent, or Firm—Barnes & Thornburg

[57] ABSTRACT

The invention relates to a tensioning arrangement with a damping device for a belt drive. The tensioning arrangement includes a combination of a pivotal roller lever which supports a tensioning roller, a tension spring engagable with the roller lever and a damping device attached to the roller lever.

In order to facilitate a rapid installation and tensioning of the belt on the belt drive, the end of the tension spring opposite the roller lever is connected with a pivotable spring tensioning lever, which spring tensioning lever is selectively movable from a position where the belt is provided with no pretensioning to a pretensioning position where the spring exhibits a predetermined pretensioning force at the belt tensioning roller.

12 Claims, 1 Drawing Figure

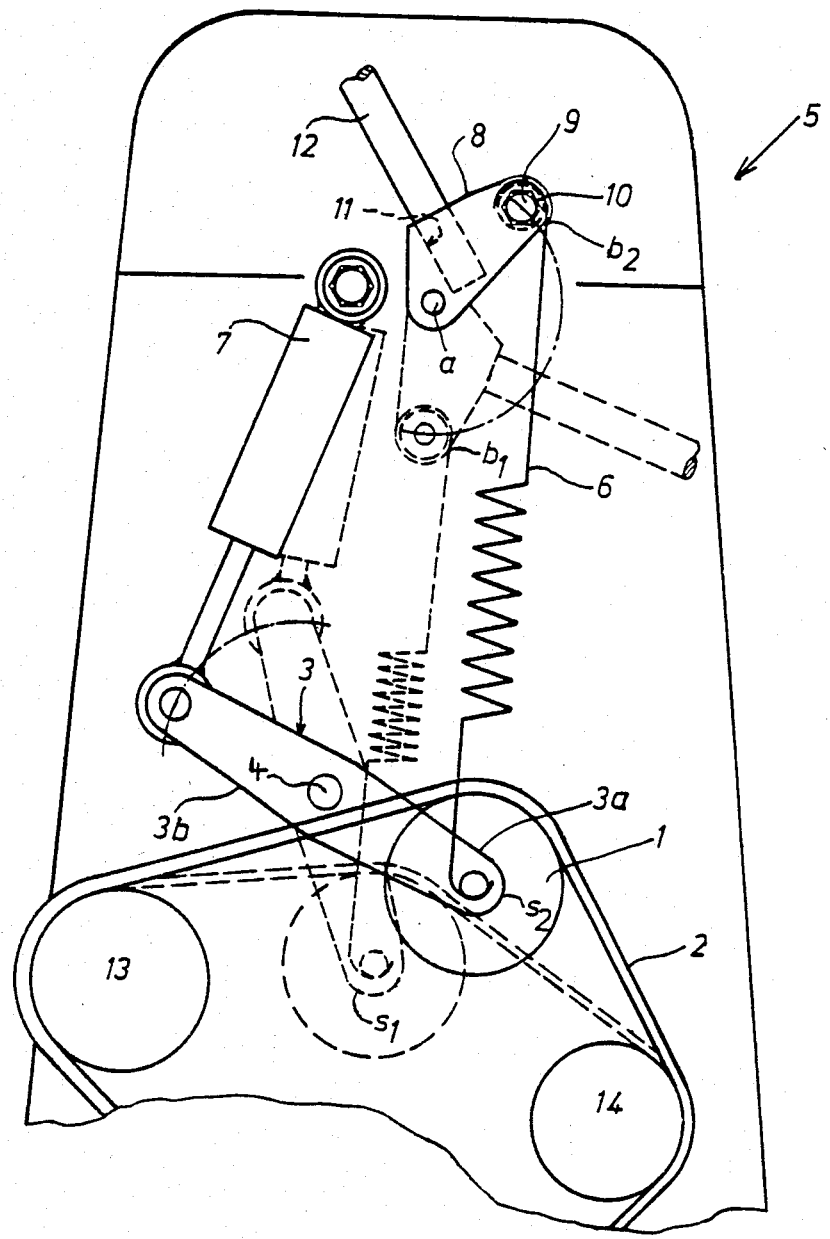

TENSIONING ARRANGEMENT WITH A DAMPING DEVICE FOR A BELT DRIVE

BACKGROUND AND SUMMARY OF THE INVENTION

The invention concerns itself with a tensioning arrangement with a damping device for a belt drive of the type with a belt engaging tensioning roller on a pivotally mounted roller lever which is connected to a pretensioning spring to apply pretensioning force to the belt.

With known tensioning arrangements, the tensioning or tightening and loosening of the belts of a belt drive is laborious and not entirely without danger and cannot be accomplished outside of a work shop without problems. Furthermore the adjustment of the correct belt pretensioning force is time consuming.

The problem which the present invention is concerned with relates to the provision of a tensioning device for a belt drive, wherein a belt can be installed in the shortest time and can also quickly be removed, and further wherein pretensioning of the belt can be simply accomplished. Furthermore the vibration resulting from the deviations in the rotational form or shape of the driving or the driven aggregates experienced by the tensioning device should be efficiently damped. Beyond this, the tensioning arrangement of the belt drive should function maintenance free.

According to preferred embodiments of the invention, the above-noted problems are solved by providing an arrangement wherein a pivotal spring tensioning lever is provided for selectively pretensioning and relaying the tensioning spring by means of a handle engageable in a receptacle of the spring tensioning lever. In preferred embodiments the tensioning spring is connected to one of two arms of the roller lever, the other arm of the roller lever being connected to a damping device when the roller lever is in operative position with the tensioning roller applying pretensioning force to the belt.

In especially preferred embodiments, the spring tensioning lever is fastened to a fixed support part when in its belt pretensioning position. A particularly advantageous and simple construction provides that the spring tensioning lever is attached to the fixed support part by a threaded bolt or screw extending through a bore in the spring tensioning lever. The damping device is preferably a telescoping type hydraulic or friction damper.

These and further objects, features and advantages of the present invention will become more obvious from the following description when taken in connection with the accompanying drawing which show, for purposes of illustration only, a single embodiment in accordance with the present invention.

BRIEF DESCRIPTION OF THE DRAWING

The single drawing FIGURE schematically depicts a drive belt tensioning arrangement constructed in accordance with a preferred embodiment of the invention.

DETAILED DESCRIPTION OF THE DRAWING

So as not to obscure the invention, in the drawing and this description, only those parts of a vehicle or the like where the invention can be used are schematically shown and described as are necessary to an understanding of the invention. It will be understood by those skilled in the art that the inventive belt tensioning arrangement is especially advantageous for passenger motor vehicles for fan and generator belt drives and the like.

A tensioning arrangement with a tensioning roller 1 for automatically adjusting the tension of a belt 2 includes a two armed pivotal roller lever 3 which is connected at its centrally disposed pivot axis 4 at a fixed support part 5, for example at the housing of an internal combustion engine.

A spring 6 designed as a tension spring is attached at one arm 3a of the roller lever 3, while a damping device 7 is attached to the other arm 3b, which damping device 7 is fixed at its other end to the support part 5.

The tension spring 6 is fastened at its end opposite the roller lever 3 to a pivotally movable spring tension lever 8. Lever 8 is fixable at the support part 5 in the position shown in solid lines by means of a fastening screw or bolt 9. The connection of the spring tension lever 8 can be accomplished by the extension of a fastening bolt 9 through bore 10 in the lever 8 and a threaded connection with the support part 5.

The spring tensioning lever 8 is also provided with a reception opening for a gripping handle 12, whereby the pivotal movement of the spring tension lever 8 can be easily accomplished.

The principal of operation of the special tension arrangement is as follows:

At first the roller lever 3 is disposed in the position shown in dashed lines. The tension roller 1 and the spring tension lever 8 are then located in the lowermost pivoted position. The tension spring 6 is completely relaxed and the damping device 7, constructed as a hydraulic damper, is inoperative and exerts no force on the belt.

In this disposition of the parts, the belt can be installed on the belt discs or pulleys 13 and 14 without any pretensioning.

To tension the belt, the spring tension lever 8 is pivoted, with the help of the inserted gripping handle 12, about its turning point "a" so that the spring fastening point moves from position "$b_1$" to "$b_2$" and thereby the tension spring 6 is tensioned and the tension roller 1 is moved from point "$S_1$" to "$S_2$". The spring tensioning lever 8 is then fixed into this position by means of the fixing screw or bolt 9. The hydraulic damper 7 is simultaneously moved to a position where the tensioning apparatus is effectively dampened. The damping is necessary in order to at least reduce the transfer of vibrations to the tensioning arrangement resulting from the rotational deviations in the drive or the driven aggregates associated with the belt drive.

To relax and remove the belt 2, the spring tensioning lever 8 is loosened and turned in a counterclockwise direction until the spring 6 is again completely relaxed. With a relaxed spring and pivoted tensioning roll, it is very easy to remove the belt 2 in its tension free condition.

The following advantages of the described inventive belt tensioner or tensioning apparatus are experienced:

The spring tension lever 8 is so configured that it can be turned by means of a simple work tool, for example a handle grip (with passenger vehicles, for example from the on board work tools). The tensioning and relaxation with the spring tensioning lever 8 is safe because of the simple hand maintenance or manipulations required and can also be accomplished without problems outside of a work shop or repair station. A time consuming adjustment of the correct belt pretensioning is unnecessary because the belt is automatically given the predetermined design belt pretensioning upon the fixation of the spring tension lever in its tensioning end position. A belt tension measuring apparatus is not necessary. Excessively low or high belt tensioning is effectively avoided and this further improves the belt life.

While we have shown and described a single embodiment in accordance with the present invention, it is understood that the same is not limited thereto but is susceptible to numerous changes and modifications as would be known to those skilled in the art of the present disclosure and we therefore do not wish to be limited to the details shown and described herein but intend to cover all such changes and modifications as they are encompassed by the scope of the appended claims.

We claim:

1. A tensioning arrangement for a belt drive comprising:
a tensioning roller support lever pivotably supported at a roller support pivot axle, said tensioning roller support lever exhibiting first and second lever arms extending in different directions from the roller support pivot axle,
a belt tensioning roller carried on the first lever arm,
a damping device connected with the second lever arm,
a pivotal spring tensioning lever including gripping handle accommodating means for accommodating a gripping handle,
and a tensioning spring having one end thereof connected to the first lever arm of the tensioning roller support lever and the other end thereof connected to the spring tensioning lever,
said spring tensioning lever being movable between a belt non-pretensioning position in which the belt is without pretensioning of the belt tensioning roller to a belt pretensioning position in which a predetermined belt pretensioning is applied to the belt by the belt tensioning roller.

2. Tensioning arrangement according to claim 1, wherein the spring tensioning lever is selectively fastened to a fixed support part when the belt is pretensioned.

3. Tensioning arrangement according to claim 2, wherein the spring tensioning lever exhibits a through bore in the region of the connection with the tensioning spring, through which bore a fastening screw is insertable to threadably connect the same with the support part.

4. Tensioning arrangement according to claim 2, wherein the damping device is constructed as one of a telescoping type hydraulic damper and a telescoping type friction damper.

5. Tensioning arrangement according to claim 1, wherein the spring tensioning lever exhibits a through bore in the region of the connection with the tensioning spring, through which bore a fastening screw is insertable to threadably connect the same with a fixed support part.

6. Tensioning arrangement according to claim 5, wherein the damping device is constructed as one of a telescoping type hydraulic damper and a telescoping type friction damper.

7. Tensioning arrangement according to claim 1, wherein the damping device is constructed as one of a telescoping type hydraulic damper and a telescoping type friction damper.

8. Tensioning arrangement according to claim 1 wherein the gripping handle accommodating means is a receptable opening configured to accommodate the handle of a passenger motor vehicle hand tool.

9. Tensioning arrangement according to claim 1, wherein the roller support pivot axle is carried in a fixed support part.

10. Tensioning arrangement according to claim 1, wherein said damping device is constructed as a telescoping type damper having one end connected directly to the second lever arm and the other end connected to a fixed support part.

11. Tensioning arrangement according to claim 1, wherein said first and second lever arms extend in respective opposite directions from the roller support pivot axle.

12. Tensioning arrangement according to claim 11, wherein said tensioning spring is attached to the first lever arm at the same location as the tensioning roller.

* * * * *